US009247030B2

(12) United States Patent
Lim

(10) Patent No.: US 9,247,030 B2
(45) Date of Patent: Jan. 26, 2016

(54) METHOD FOR TRANSMITTING INFORMATION OF HEAVY EQUIPMENT VEHICLE FOR CONSTRUCTION

(75) Inventor: Jong Sup Lim, Gyeonggi-d (KR)

(73) Assignee: Doosan Infracore Co., Ltd., Incheon (KR)

( * ) Notice: Subject to any disclaimer, the term of this patent is extended or adjusted under 35 U.S.C. 154(b) by 207 days.

(21) Appl. No.: 13/992,419

(22) PCT Filed: Dec. 7, 2011

(86) PCT No.: PCT/KR2011/009427
§ 371 (c)(1),
(2), (4) Date: Jun. 7, 2013

(87) PCT Pub. No.: WO2012/077973
PCT Pub. Date: Jun. 14, 2012

(65) Prior Publication Data
US 2013/0262611 A1    Oct. 3, 2013

(30) Foreign Application Priority Data

Dec. 8, 2010    (KR) .......................... 10-2010-0125178

(51) Int. Cl.
*H04L 29/06* (2006.01)
*H04L 29/08* (2006.01)
*H04W 84/20* (2009.01)

(52) U.S. Cl.
CPC ............... *H04L 69/00* (2013.01); *H04L 67/12* (2013.01); *H04W 84/20* (2013.01)

(58) Field of Classification Search
CPC ....................................................... H04L 69/00
USPC .......................... 709/203, 204, 208, 223, 224
See application file for complete search history.

(56) References Cited

U.S. PATENT DOCUMENTS

| 5,053,964 A | * | 10/1991 | Mister ..................... B60L 15/38 246/187 C |
| 2002/0059320 A1 | * | 5/2002 | Tamaru ................... E01C 19/00 |
| 2006/0161341 A1 | * | 7/2006 | Haegebarth .............. G08G 1/20 701/117 |

FOREIGN PATENT DOCUMENTS

| JP | 2003-143157 A | 5/2003 |
| JP | 2008-269395 A | 11/2008 |
| KR | 10-2006-0097889 A | 9/2006 |

OTHER PUBLICATIONS

"Collecting Construction Equipment Activity Data from Caltrans Project Records"—Justin Mark Kable, Univ. of California, Davis, Jun. 2004 http://www.uctc.net/papers/828.pdf.*
Search Report dated May 10, 2012 and written in Korean with English translation attached for International Patent Application No. PCT/KR2011/009427 filed Dec. 7, 2011, 5 pages.

* cited by examiner

*Primary Examiner* — Randy Scott
(74) *Attorney, Agent, or Firm* — John D. Veldhuis-Kroeze; Westman, Champlin & Koehler, P.A.

(57) ABSTRACT

An aspect of the present disclosure provides a method of transmitting information of a heavy equipment vehicle for construction, in which a plurality of slave vehicles having slave communication equipment mounted thereon, master communication equipment capable of communicating with the slave communication equipment of each slave vehicle or a master vehicle having the master communication equipment mounted thereon, and a server capable of communicating with the master communication equipment are provided, and information of each slave vehicle is transmitted to the server through each piece of the slave communication equipment and the master communication equipment, and control information of the server is transmitted to each slave vehicle through the master communication equipment and each piece of slave communication equipment.

1 Claim, 4 Drawing Sheets

METHOD FOR TRANSMITTING INFORMATION OF HEAVY EQUIPMENT VEHICLE FOR CONSTRUCTION

CROSS-REFERENCE TO RELATED APPLICATION

This application is a Section 371 National Stage Application of International Application No. PCT/KR2011/009427, filed Dec. 7, 2011 and published, not in English, as WO2012/077973 on Jun. 14, 2012.

FIELD OF THE DISCLOSURE

The present disclosure relates to a method of transmitting information of a heavy equipment vehicle for construction, and more particularly, to a method of transmitting information of a heavy equipment vehicle for construction, in which a plurality of slave vehicles transmits information to one master communication equipment, and the master communication equipment transmits the information to a server, thereby reducing communication cost.

BACKGROUND OF THE DISCLOSURE

In general, a heavy equipment vehicle for construction includes communication equipment capable of communicating with a server, such as a wireless communication terminal, and directly transmits various information including position information to the server by using mobile communication (GSM, CDMA, and the like) and satellite communication and directly receives necessary information from the server.

Accordingly, as the number of heavy equipment vehicles for construction is increased, purchase cost, mounting cost, and communication cost of the communication equipment are proportionally increased.

That is, in a case where communication equipment, which is capable of independently communicating with a server, is mounted on all of the plurality of heavy equipment vehicles for construction operated at a construction site, communication equipment cost is increased, and various communication costs including communication subscription cost, communication opening costs, and communication use costs are also increased.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An aspect of the present disclosure is conceived in view of the situation in the related art, and an object of the present disclosure provides a method of transmitting information of a heavy equipment vehicle for construction, which is capable of transmitting information of each heavy equipment vehicle for construction to a server and receiving necessary information from the server without mounting high-priced communication equipment capable of communicating with the server in a plurality of heavy equipment vehicles for construction, thereby reducing communication equipment cost and communication cost of the heavy equipment vehicle for construction.

In order to achieve the above object, an aspect of the present disclosure provides a method of transmitting information of a heavy equipment vehicle for construction, in which a plurality of slave vehicles having slave communication equipment mounted thereon, master communication equipment capable of communicating with the slave communication equipment of each slave vehicle or a master vehicle having the master communication equipment mounted thereon, and a server capable of communicating with the master communication equipment are provided, and information of each slave vehicle is transmitted to the server through each piece of the slave communication equipment and the master communication equipment, and control information of the server is transmitted to each slave vehicle through the master communication equipment and each piece of slave communication equipment, the method including: generating data to be transmitted by the slave vehicle; identifying whether data to be transmitted by the slave vehicle is present; identifying whether the master communication equipment is present in the vicinity of the slave vehicle when the data to be transmitted by the slave vehicle is present; identifying whether the communication between the master communication equipment and the slave communication equipment is available when the master communication equipment is present in the vicinity of the slave vehicle; transmitting the data of the slave vehicle to the master communication equipment by the slave communication equipment when the communication between the master communication equipment and the slave communication equipment is available; transmitting the data of the slave vehicle to the server by the master communication equipment; and identifying the received data of the slave vehicle by the server.

Further, the method of transmitting the information of the heavy equipment vehicle for construction according to an aspect of the present disclosure further includes: identifying whether an open communication network is present in the vicinity of the slave vehicle when the master communication equipment is not present in the vicinity of the slave vehicle; and directly transmitting information of the slave vehicle to the server by the slave communication equipment when the open communication network is present in the vicinity of the slave vehicle.

In the meantime, an aspect of the present disclosure provides a method of transmitting information of a heavy equipment vehicle for construction, in which a plurality of slave vehicles having slave communication equipment mounted thereon, master communication equipment capable of communicating with the slave communication equipment of each slave vehicle or a master vehicle having the master communication equipment mounted thereon, and a server capable of communicating with the master communication equipment are provided, and information of each slave vehicle is transmitted to the server through each piece of the slave communication equipment and the master communication equipment, and control information of the server is transmitted to each slave vehicle through the master communication equipment and each piece of slave communication equipment, the method including: generating data to be transmitted by the server; identifying whether the data to be transmitted by the server is present; identifying whether the data to be transmitted by the server is data to be transmitted to the all of the heavy equipment vehicles for construction; generating a data set in which a unique identification number of a corresponding heavy equipment vehicle for construction is added to the data when the data to be transmitted by the server is not the data to be transmitted to the all of the heavy equipment vehicles for construction; transmitting the data set of the corresponding heavy equipment vehicle for construction to the master communication equipment by the server; and identifying whether the data set of the corresponding heavy equipment vehicle for construction is received by the master communication equipment.

Further, the method of transmitting the information of the heavy equipment vehicle for construction according to an aspect of the present disclosure further includes: when the data to be transmitted by the server is data to be transmitted to the all of the heavy equipment vehicles for construction, transmitting the data to the master communication equipment by the server; and identifying whether the data of the all of the heavy equipment vehicles for construction is received by the master communication equipment.

According to the method of transmitting the information of the heavy equipment vehicle for construction according to an aspect of the present disclosure, information of a plurality of slave vehicles is transmitted to a server through master communication equipment or a master vehicle having the master communication equipment mounted thereon, which is operated at a construction site, so that it is not necessary to mount high-priced communication equipment on each vehicle, thereby achieving an effect of reducing communication equipment cost, communication opening cost, and the like, and the plurality of heavy equipment vehicles for construction operated at the construction site does not independently communicate with the server, but communicates with the server by using the master communication equipment, thereby achieving an effect of considerably reducing communication cost.

DETAILED DESCRIPTION

Hereinafter, detailed technical contents of an aspect of the present disclosure for achieving the objects will be described in detail with reference to the accompanying drawings.

Figure 1:
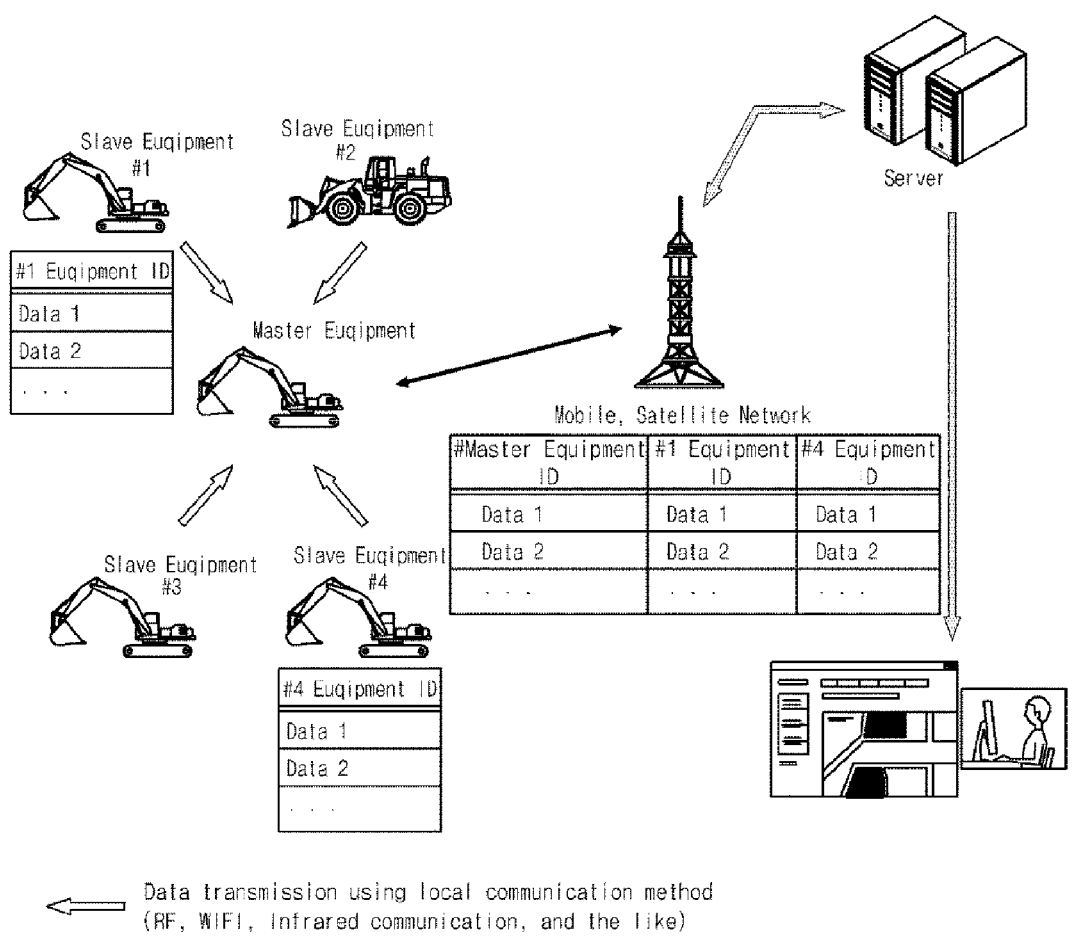
FIG. 1 is a diagram illustrating an example of data transmission according to an exemplary embodiment of the present disclosure.
Figure 2:
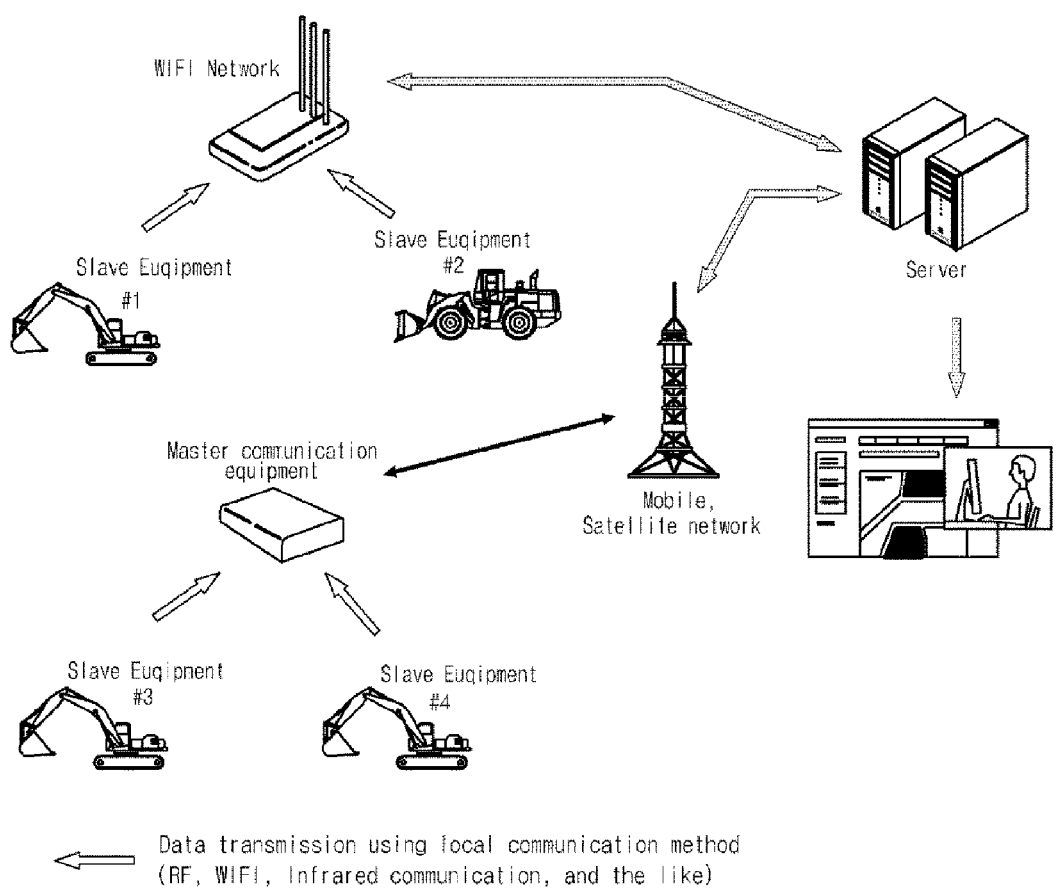
FIG. 2 is a diagram illustrating an example of data transmission according to another exemplary embodiment of the present disclosure.

FIG. 1 illustrates an example of data transmission according to an exemplary embodiment of the present disclosure, and FIG. 2 illustrates an example of data transmission according to another exemplary embodiment of the present disclosure.

The exemplary embodiment of FIG. 1 is a case where one of a plurality of heavy equipment vehicle for construction in a construction site is a master vehicle having master communication equipment mounted thereon, and all of the remaining vehicles are slave vehicles having slave communication equipment mounted thereon, and the exemplary embodiment of FIG. 2 is a case where all of a plurality of heavy equipment vehicles for construction in a construction site are slave vehicles having slave communication equipment mounted thereon.

In an aspect of the present disclosure, the heavy equipment vehicle for construction is broadly divided into the master vehicle having the master communication equipment capable of communicating with a server mounted thereon, and the slave vehicle having the slave communication equipment capable of communicating with the master communication equipment mounted thereon.

In an aspect of the present disclosure, in a case where the master vehicle is present among the plurality of heavy equipment vehicle for construction operated at the construction site, vehicle information is transmitted through the master communication equipment of the master vehicle as illustrated in FIG. 1, and in a case where there is no master vehicle and only the slave vehicle is present, vehicle information is transmitted by using separate master communication equipment as illustrated in FIG. 2.

Figure 3:
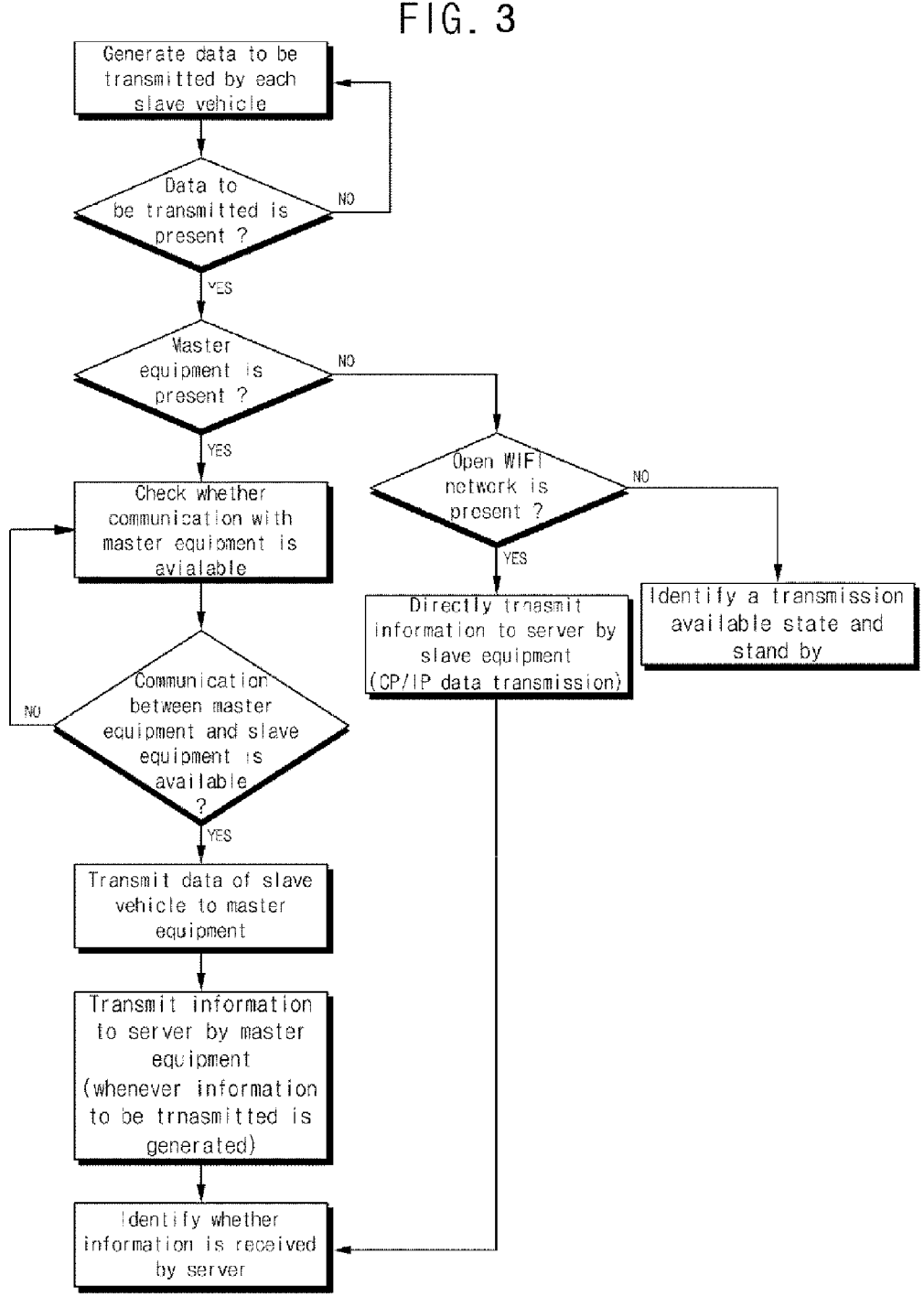
FIG. 3 is a flowchart of transmission of information data of a slave vehicle according to an aspect of the present disclosure.

FIG. 3 illustrates flowchart of transmission of information data of the slave vehicle according to an aspect of the present disclosure.

As illustrated in FIG. 3, according to the exemplary embodiment of an aspect of the present disclosure, the plurality of slave vehicles having the slave communication equipment mounted thereon, the master communication equipment capable of communicating with the slave communication equipment of each slave vehicle, or the master vehicle having the master communication equipment mounted thereon, and the server capable of communicating with the master communication equipment are provided, information of each slave vehicle is transmitted to the server through each slave communication equipment and the master communication equipment, and control information of the server is transmitted to each slave vehicle through the master communication equipment and each piece of the slave communication equipment.

A method of transmitting information of a heavy equipment vehicle for construction according to an aspect of the present disclosure includes: generating data to be transmitted by a slave vehicle; identifying whether master communication equipment is present in the vicinity of the slave vehicle; when the communication is available between the master communication equipment and the slave communication equipment, transmitting data of the slave vehicle to the master communication equipment by the slave communication equipment; and transmitting data of the slave vehicle to the server by the master communication equipment.

Further, in the method of transmitting the information of the heavy equipment vehicle for construction according to an aspect of the present disclosure, when the master communication equipment is not present in the vicinity of the slave vehicle, it is identified whether a communication network, such as an open WiFi network is present in the vicinity of the slave vehicle, and when the communication network capable of communicating with the server, such as the open WiFi network, is present in the vicinity of the slave vehicle, the slave communication equipment directly transmits the information of the slave vehicle to the server.

In the method of transmitting the information of the heavy equipment vehicle for construction according to an aspect of the present disclosure, after the data to be transmitted by the slave vehicle is generated, it is identified whether the data to be transmitted by the slave vehicle is present, when the data to be transmitted by the slave vehicle is present, it is identified whether the master communication equipment is present in the vicinity of the slave vehicle, when the master communication equipment is present in the vicinity of the slave vehicle, it is identified whether the communication between the master communication equipment and the slave communication equipment is available, and when the communication between the master communication equipment and the slave communication equipment is available, the slave communication equipment transmits the data of the slave vehicle to the master communication equipment.

Figure 4:
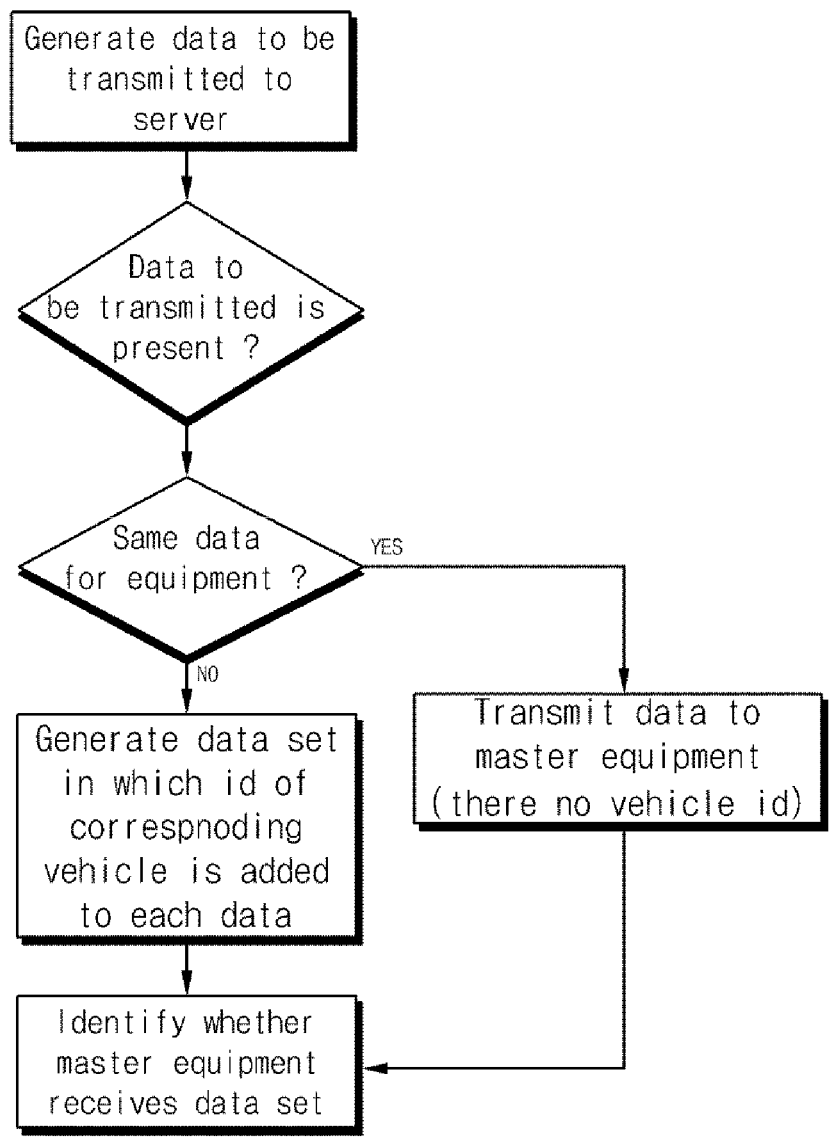
FIG. 4 is a flowchart of transmission of information data of a server according to an aspect of the present disclosure.

FIG. 4 illustrates a flowchart of transmission of information data of the server according to an aspect of the present disclosure.

According to FIG. 4, in the method of transmitting the information of the heavy equipment vehicle for construction according to an aspect of the present disclosure, the plurality of slave vehicles having the slave communication equipment mounted thereon, the master communication equipment capable of communicating with the slave communication equipment of each slave vehicle, or the master vehicle having the master communication equipment mounted thereon, and the server capable of communicating with the master communication equipment are provided, information of each slave vehicle is transmitted to the server through each piece of the slave communication equipment and the master communication equipment, and control information of the server is transmitted to each slave vehicle through the master communication equipment and each piece of the slave communication equipment.

Further, in the method of transmitting the information of the heavy equipment vehicle for construction according to an aspect of the present disclosure, after data to be transmitted by the server is generated, it is identified whether the data to be transmitted by the server is present, it is identified whether the data to be transmitted by the server is data to be transmitted to the all of the heavy equipment vehicles for construction, a data set in which a unique identification number of the corresponding heavy equipment vehicle for construction is added to the data is generated when the data to be transmitted by the server is not the data to be transmitted to the all of the heavy equipment vehicles for construction, and then the server transmits the data set of the corresponding heavy equipment vehicle for construction to the master communication equipment.

Here, when the data to be transmitted by the server is the data to be transmitted to the all of the heavy equipment vehicles for construction, the server transmits the data to the master communication equipment, and whether the data set of the all of the heavy equipment vehicles for construction is received by the master communication equipment is identified.

As described above, the method of transmitting the information of the heavy equipment vehicle for construction according to an aspect of the present disclosure includes: transmitting a data set of a corresponding heavy equipment vehicle for construction to the master communication equipment by the server; and identifying whether the data set of the corresponding heavy equipment vehicle for construction is received by the master communication equipment.

In the method of transmitting the information of the heavy equipment vehicle for construction according to an aspect of the present disclosure, the data set includes a unique identification number of the corresponding heavy equipment vehicle for construction.

The method of transmitting the information of the heavy equipment vehicle for construction according to an aspect of the present disclosure includes: directly transmitting the data to the corresponding heavy equipment vehicle for construction without passing through the master communication equipment when the communication network capable of directly communicating with the server, such as an open WiFi network, is present in the vicinity of the corresponding heavy equipment vehicle for construction; transmitting the data to the master communication equipment by the server when the data to be transmitted by the server is the data to be transmitted to the all of the heavy equipment vehicles for construction; and identifying whether the data of the all of the heavy equipment vehicles for construction is received by the master communication equipment.

In an aspect of the present disclosure, in a situation where the plurality of heavy equipment vehicles for construction is operated at one construction site, each heavy equipment vehicle for construction does not separately transmit data, but one piece of master communication equipment or one master vehicle having the master communication equipment mounted thereon collects and transmits the information of the plurality of slave vehicles having the slave communication equipment mounted thereon together to the server, so that it is possible to reduce communication equipment cost and communication cost, and a business owner of heavy equipment for construction may reduce a work load according to a joining and opening process of communication equipment.

In an aspect of the present disclosure, local communication is used in order to transmit the data from the plurality of slave vehicles to the master communication equipment, and a communication means, such as WiFi, RF, and infrared communication, is not limited.

In an aspect of the present disclosure, the master communication equipment may be mounted on the master vehicle, and may be a communication terminal to be independently used in the construction site, so that the master communication equipment is not limited.

In the meantime, in a case where an access to the communication network, such as the open WiFi network, is available, since the slave vehicle may directly transmit the data to the server by using data communication (TCP/IP), the master communication equipment is not required, and it is not necessary to pay communication cost.

In an aspect of the present disclosure, when the slave vehicle generates the data to be transmitted, it is searched whether the master communication equipment is present in the vicinity of the slave vehicle, and when the master communication equipment is present, the slave vehicle transmits the data to the master communication equipment.

When the master communication equipment is not present, and a communication signal, such as a WiFi signal, through which communication is available with a server, is not received, it is determined that there is no means capable of transmitting the data, and identification of a signal and standby are performed until a transmission available state is ready.

When the slave vehicle transmits the data to the master communication equipment, the slave vehicle includes a unique identification number (ID) of the vehicle in the data and transmits the data in order to discriminate a vehicle which transmits the data, and the master communication equipment stores the collected data, and transmits the data together to the server when the communication available state is ready, and the server receives the transmitted data and processes information to be stored in a database for each unique identification number (ID) of each vehicle.

When the server transmits the data to the heavy equipment vehicle for construction, the server distinguishes whether the data is data specialized for each heavy equipment vehicle for construction or the same data, and when the data is the same data, the server transmits the data to the master communication equipment, and the master communication equipment receiving the data transmits the corresponding information when the slave communication equipment of the slave vehicle is in a reception available state.

For example, when the server transmits the same data, such as data initialization, to the heavy equipment vehicle for construction, it is possible to remarkably decrease the amount of transmission data.

That is, issuing an initialization command to one piece of equipment has an effect of issuing an initialization command to the plurality of heavy equipment vehicles for construction.

In an aspect of the present disclosure, in a case where the data is the data specialized for each heavy equipment vehicle for construction, the data set including the unique identification number ID of each vehicle is generated, the generated data set is transmitted to the master communication equipment, and the master communication equipment receiving the information transmits the corresponding data to the slave communication equipment when the master communication equipment is in a state capable of communicating with the slave communication equipment of the slave vehicle, and deletes only the corresponding data.

The aforementioned present disclosure is not limited to the aforementioned description, and it will be obvious to a person of ordinary skill in the art that various substitutions, modifications, and changes are made within the scope not departing from of the technical spirit of the present disclosure.

According to the method of transmitting the information of the heavy equipment vehicle for construction according to an aspect of the present disclosure, information of a plurality of slave vehicles is transmitted to a server through master communication equipment or a master vehicle having the master communication equipment mounted thereon, which is operated at a construction site, so that it is not necessary to mount high-priced communication equipment on each vehicle, thereby achieving an effect of reducing communication equipment cost, communication opening cost, and the like, and the plurality of heavy equipment vehicles for construction operated at the construction site does not independently communicate with the server, but communicates with the server by using the master communication equipment, thereby achieving an effect of considerably reducing communication cost.

Although the present disclosure has been described with reference to exemplary and preferred embodiments, workers skilled in the art will recognize that changes may be made in form and detail without departing from the spirit and scope of the disclosure.

The invention claimed is:

1. A method of transmitting information of a heavy equipment vehicle for construction, in which a plurality of slave vehicles having slave communication equipment mounted thereon, master communication equipment capable of communicating with the slave communication equipment of each slave vehicle or a master vehicle having the master communication equipment mounted thereon, and a server capable of communicating with the master communication equipment are provided, and information of each slave vehicle is transmitted to the server through each piece of the slave communication equipment and the master communication equipment, and control information of the server is transmitted to each slave vehicle through the master communication equipment and each piece of slave communication equipment, the method comprising:

identifying whether the data to be transmitted by the server is the same data to be transmitted to all of the heavy equipment vehicles for construction;

when the data to be transmitted by the server is not the same data to be transmitted to all of the heavy equipment vehicles for construction, generating the data set in which a unique identification number of the corresponding heavy equipment vehicle for construction is added to the data;

when the data to be transmitted by the server is the same data to be transmitted to all of the heavy equipment vehicles for construction, transmitting the data set to the master communication equipment by the server; and identifying whether the data set of all of the heavy equipment vehicles for construction is received by the master communication equipment;

when an open communication network is present in the vicinity of the corresponding heavy equipment vehicle for construction, directly transmitting the data to the corresponding heavy equipment vehicle for construction without passing through the master communication equipment; and when the master communication equipment and the open communication network are not present, identification of a signal and standby are performed until a transmission available state is ready;

wherein the data set includes a unique identification number of the corresponding heavy equipment vehicle for construction.

* * * * *